United States Patent [19]
Doolin et al.

[11] Patent Number: 5,346,367
[45] Date of Patent: Sep. 13, 1994

[54] ADVANCED COMPOSITE ROTOR BLADE

[75] Inventors: Leonard J. Doolin, Milford; Eric G. Olsen, Woodbury; William C. Reinfelder, Woodbridge; George Capowich, Shelton, all of Conn.

[73] Assignee: United Technologies Corporation, Hartford, Conn.

[21] Appl. No.: 902,991

[22] Filed: Sep. 2, 1986

Related U.S. Application Data

[63] Continuation-in-part of Ser. No. 685,174, Dec. 21, 1984, abandoned.

[51] Int. Cl.$^5$ ............ B63H 1/26; B63H 5/06; B63H 7/02; F01D 5/14
[52] U.S. Cl. ............ 416/230; 416/229 R; 156/213
[58] Field of Search ......... 416/230 A, 230 R, 223 R, 416/229 R, 241 R, 241 A, 226; 156/213, 221, 245, 293; 264/137, 152, 258

[56] References Cited

U.S. PATENT DOCUMENTS

| | | | |
|---|---|---|---|
| 2,484,141 | 10/1949 | Alex | 416/230 A |
| 3,754,840 | 8/1973 | Zincone | 416/230 A |
| 3,782,856 | 1/1974 | Salkind | 416/230 A |
| 3,999,888 | 12/1976 | Zincone | 416/230 A |
| 4,302,155 | 11/1981 | Grimes | 416/230 |
| 4,639,284 | 1/1987 | Mouille | 156/213 |

OTHER PUBLICATIONS

"Development of a Composite Tail Rotor Blade for the MH-53E" Andrew J Lapati & Audbor E. Thompson, 41st Annual Forum, AHS, May 17, 1985.

*Primary Examiner*—David Brown

[57] ABSTRACT

An advanced composite blade construction for a helicopter rotor blade using for the most part fiber reinforced plastic materials in which the major assembly of blade elements is a single step co-cure operation and in which an integral spar/skin carries centrifugal, flapwise and chordwise loads and also incorporates redundant means to carry torsional loads and a honeycomb core carries shear and aerodynamic pressures loads.

6 Claims, 3 Drawing Sheets

ADVANCED COMPOSITE ROTOR BLADE

CROSS-REFERENCE TO RELATED APPLICATIONS

This is a continuation-in-part of Application Ser. No. 685,174 filed Dec. 21, 1984, now abandoned.

TECHNICAL FIELD

This invention relates to helicopter rotor blades and more particularly to a rotor blade of fiber reinforced plastic composite construction manufactured according to a single-step major cure process.

BACKGROUND ART

Alex Pat. No. 2,484,141 shows a composite rotor blade having a cellular core section for helicopter use. Zincone Pat. No. 3,754,840 shows an advanced composite helicopter rotor blade having a particular construction for carrying centrifugal and torsional loads, and Zincone Pat. No. 3,999,888 shows a tip weight attachment construction for an advanced composite helicopter rotor blade.

DISCLOSURE OF INVENTION

An object of the present invention is to provide a structurally efficient advanced composite helicopter rotor blade which affords improved performance for mission requirements, has extended life, involves a low cost manufacturing process and has a minimum impact on rotor head components.

Another object of the invention is the provision of an advanced composite helicopter rotor blade configuration which permits manufacture by co-curing of essentially all of the individual blade elements in a single step.

Still another object of the invention is an advanced composite helicopter rotor blade configuration in which the structural skin carries chordwise loads and also is a redundant means to carry torsional loads and the core carries shear and also aerodynamic loads.

The foregoing and other objects, features and advantages will be apparent from the specification and claims and from the accompanying drawings which illustrate an embodiment of the invention.

BEST MODE FOR CARRYING OUT THE INVENTION

Figure 1:
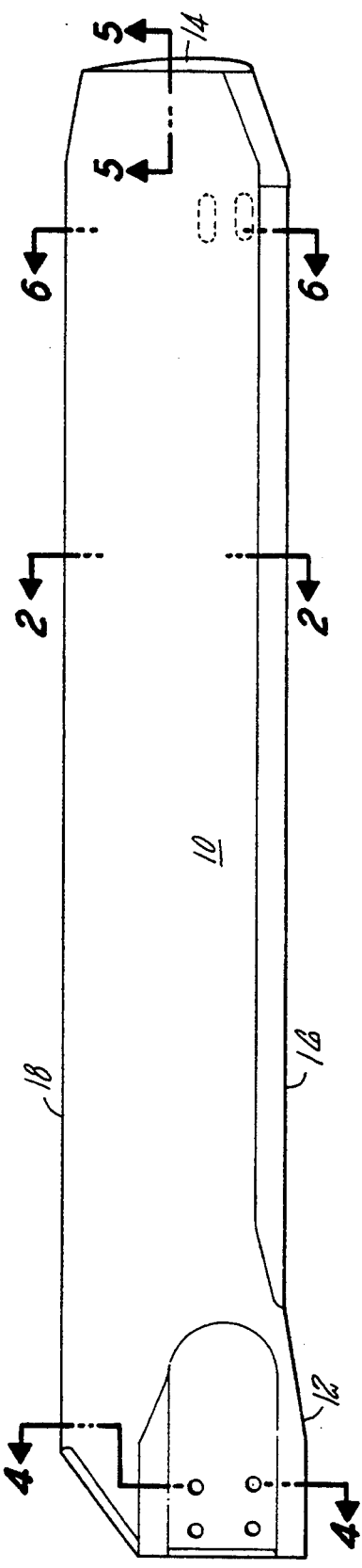
FIG. 1 is a plan view of a helicopter tail rotor blade according to the invention.
Figure 2:
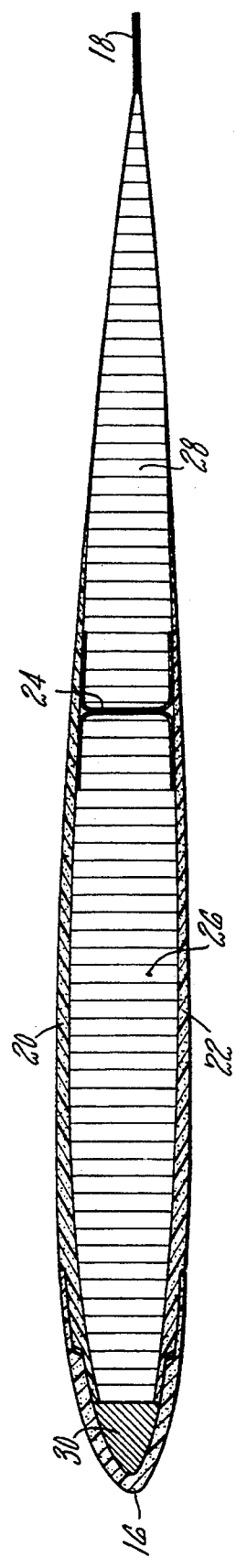
FIG. 2 is a chordal section through the blade along line 2—2 in FIG. 1.

In FIG. 1, tail rotor blade 10 of advanced composite construction is shown. The construction involves items of fiber reinforced plastic materials, all formed, cured, and assembled according to a predetermined grouping and in specific stages. The blade has root portion 12, tip portion 14, leading edge 16 and trailing edge 18. In the chordal section of FIG. 2, upper and lower spar members are shown at 20 and 22, respectively. Web 24 extends spanwise at the mid portion of the blade and honeycomb cores 26 and 28 fill the blade internal area on either side of the web using, as necessary, a plurality of core densities appropriate to achieving acceptable structure and composite material processing. For example, a more dense core could be used between the leading edge and the web in the inner or root portion of the span where curing pressures are higher. Metallic counterweight 30 is located at the leading edge 16 of the blade along at least a portion of the span, usually the outboard portion.

Figure 3:
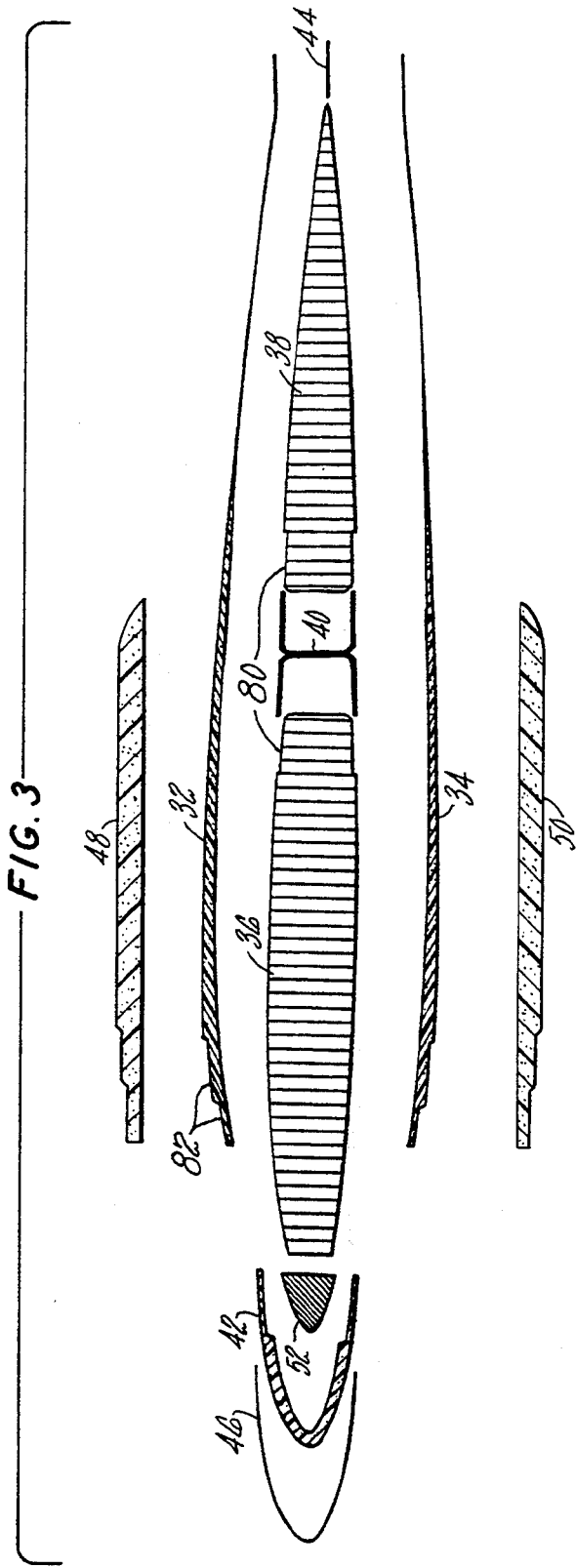
FIG. 3 is a representative exploded view of a chordal section through the blade of FIG. 1.

FIG. 3 is a breakout of the detail parts of the composite blade structure. The blade includes top integrated spar/skin 32, and bottom integrated spar/skin 34 which taper in chordwise and spanwise directions over Nomex honeycomb cores 36 and 38. The skin, which is generally the outer portion of the integrated spar/skin, consists of a ply layup which has fibers oriented at ±45° for maximum torsional strength. The preferable skin material is a combination of resin impregnated fiberglass fabric such as manufactured by Owens Corning of New York and graphite tape, both curable at temperatures of 300° F. The spar portion of the integrated spar/skin has a ply layup involving a plurality of fiber groupings in each of which there are two plies at 0°, one ply at +30° and one ply at −30° [$0_2/\pm30°$] for a suitable combination of torsional and axial strength. The preferable spar material is a resin impregnated graphite fabric such as manufactured by Celanese Chemical Co. of New York and is curable at a temperature of about 300° F. In addition to and between the cores, is placed a partially pre-cured I-shaped web 40 at approximately 50% chord in order to provide a "backwall" to the spar for torsional strength. The web is a composite layup of two back to back "C" sect ions forming an I-beam. The wall and inner flange surfaces of the web are dimensioned to closely fit the edges and necked-down outer surfaces 80 of the adjacent cores. Also, stiffener 44 forms the trailing edge to add chordwise stiffness. The top and bottom spar/skin structures are integrated to form a closed spar by leading edge sheath 42. Sheath 42 incorporates metallic abrasion strip 46 which provides protection both chordwise and spanwise against rain and other foreign objects. Leading edge sheath 42 has a ply layup involving a plurality of fiber groupings in each of which there are two plies at 0°, one ply at 30° and one ply at −30° [$0_2/\pm30°$].

Figure 4:
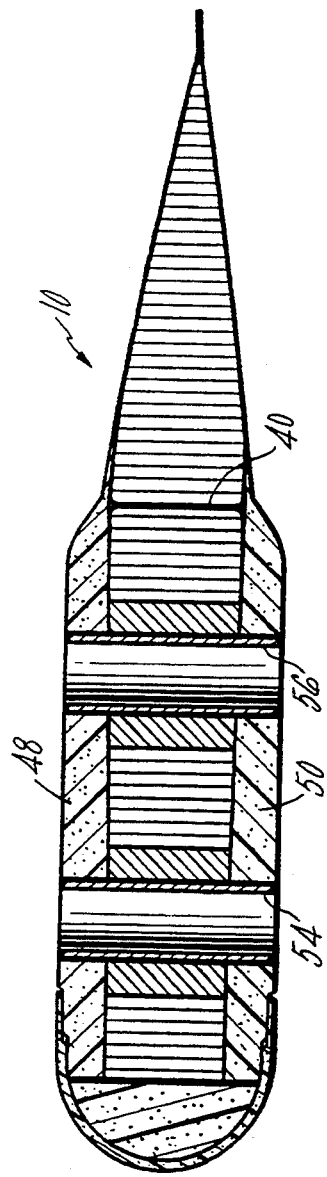
FIG. 4 is a section through the root end of the blade along line 4—4 in FIG. 1.

Laminates 48 and 50, which are not necessarily separate elements but may constitute additional plies laid up at the time of the process, are used at the root end of the blade as blade attachment structural elements. In the root end section of FIG. 4, blade 10 is shown with the laminates molded in place. Metallic counterweight 52 which is wrapped in fiberglass extends within sheath 42 along at least a portion of the span. The counterweight may be one continuous member or it may be a number of separate similar members along the span. Except for the honeycomb cores, abrasion strip and counterweight, the blade elements preferably are of graphite material which is used because of its high strength to weight ratio.

Metallic bushings 54 and 56 are provided for bolting the blade to the rotor hub. The slightly larger section area of the root end transitions in a spanwise direction into the major blade section as exemplified by FIG. 2 by select tapering of the plies in laminates 48 and 50.

Figure 5:
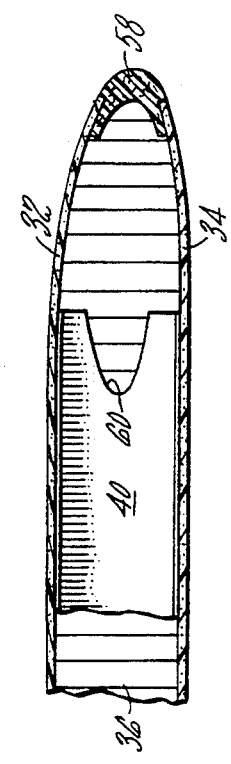
FIG. 5 is a section through the tip end of the blade along line 5—5 in FIG. 1.

At the tip of the blade, as shown in FIG. 5, a relatively small precured plug member 58 of lightweight advanced composite construction such as chopped Kevlar or fiberglass in an epoxy matrix is sandwiched between the upper and lower skins, 32 and 34 respectively, to structurally close out and seal the tip. The tip end of web 40 has its vertical portion cut back as shown by scallop 60. This is done to minimize shear stress concentration and provide a better shear flow pattern in that portion of the blade. The blade tip geometry is designed for reduced acoustical noise resulting from: (1) a thickness reduction (to about 6% from about 9.5%) over the outer span and (2) a tip sweep of about 20° aft on the leading edge and about 15° forward on the trailing edge reducing the apparent velocity normal to the blade section. The ability to obtain both geometry and structure is made feasible through the use of the skin-plug construction.

Figure 6:
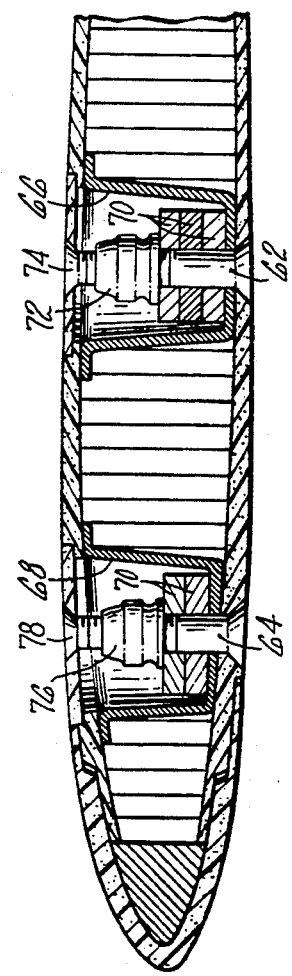
FIG. 6 is a chordwise section through the tip of the blade along line 6—6 in FIG. 1 showing the tip weights.

Adjacent to the tip and as shown in FIG. 6 which is a partial chordal section through the blade, a plurality of variable weights are incorporated for span and chordwise dynamic balance purposes. In FIG. 6, bolts 62 and 64 are attached to the spar/skin of the blade and extend into cups 66 and 68, respectively, which are on either side of the leathering axis. Disc-type weights 70 are mounted on the bolts within the cups as needed. The weights are retained in place on bolt 62 by nut 72 and screw 74 and on bolt 64 by nut 76 and screw 78. The loading of the weights is transferred through the bolts and screws to the upper and lower spar/skin rather than through the cups. This affords a significantly lighter structure and affords a double shear connection of the weights in the spar rather than the typical single shear connection.

As a result of the construction, with the skin being structural, there is redundancy in the torsional load path, the load also being taken by the trailing edge portion of the blade. The skin carries chordwise and also torsional loads, and the honeycomb core and web carry shear loads and also aerodynamic loads. The normal torsional load path is essentially a tube consisting of upper and lower spar/skin 32,34, leading edge sheath 42 and web 40. If web 40 should be damaged, the load path would be upper and lower spar/skin 32,34, leading edge sheath 42 and the trailing edge including stiffener 44. If the trailing edge also should should be damaged, the load path then would be the spar/skin 32,34, leading edge sheath 42 and honeycomb core 38. Stress in the core is minimized by making the spar/skin chordwise taper as long as possible. The incorporation of a web into the design affords adequate torsional stiffness and strength without a weight penalty and permits control of the location of the shear center.

It should be recognized that the structure of the rotor blade, including its internal components and constituents as described in the preceding paragraphs, is a blend of items chosen for their compatibility to a reproducible manufacturing process developed to efficiently produce a rotor blade fully meeting all load transmitting, shape and size requirements within the small tolerance deviations allowed. In this invention, the manufacturing process is as important to the final result as is the selection of blade components. The major feature of this process is that a carefully chosen group of the blade components are selected to be subjected to an extensive forming, layup, and co-curing operation in a matched mold operation to form a major blade portion, while the remaining few components are independently fabricated and subsequently joined to the major molded portion by a simple assembly step. In accordance with the objectives listed supra, the complete manufacturing cycle consisting of a major layup/cure operation and several minor layup and assembly operations is as close to a "one-shot" or "single cure" process as possible, given that the final product is a relatively large, complicated, expensive helicopter rotor blade. This full process is performed as follows:

A matched metal or clam shell type mold is constructed of upper and lower concave halves conforming on their inner surfaces to the desired external airfoil contours and configured to be clamped together by mechanical or hydraulic pressure with high temperature for curing of the composite blade. The mold length is configured to accommodate the full span of the blade, and its chordwise portion is limited to the chordwise dimension of the spar/skin 32 and 34. Uncured spar/skin laminates are placed into the upper and lower concave portions of the matched metal mold; honeycomb core, web, trailing edge stiffener, root laminates, root spacers, tip closure and balance cups are placed over one spar/skin laminate into one metal mold portion. Film Adhesive is provided as required. The mold portions are then mated to compact the laminates, thereby removing air and volatiles from the composite layup, and the entire mold is placed in a press at a temperature of about 300° F. for curing.

The honeycomb core, which is preferably of phenolic impregnated nylon paper such as manufactured by E.I. DuPont de Nemours and Company under the trademark Nomex®, is initially oversized in thickness by about 0.05 inches to generate back pressure to the spar/skin layup during cure at a right angle to the blade chord. Typically, a pressure of about 50 lb/in$^2$ is required to assure removal of air and volatiles from the preimpregnated fabric. Since the primary cure cycle utilizes a matched metal molding process, the core height is critical to the back pressure generated. The use of honeycomb core to form the spar/skin is particularly beneficial to the process inasmuch as the use of an internal pressure bag or mandrel is avoided. Pressure bags are difficult to position and seal, require internal details such as the web portion to be critically supported/positioned during fabrication, require the use of release agents for bag removal leaving a contaminant residue, and present a problem in the event of failure. Mandrels, on the other hand, do not adapt well to changing internal geometry, require the use of release agents and are often unmanageably weighty. In this blade construction, neither bags nor mandrels would provide adequate back pressure in the vicinity of the co-cure tip closure.

Prior to its insertion into the mold, the web is independently and partially cured sufficient to be handled while retaining its shape and size. The shape of the web flanges, or open "C" shaped portions, are formed spread apart to more readily allow the necked-down abutting core edges to seat at the common web wall.

The product of the molding operation described above comprises about 90% of the cross-section of the blade, but does not include the leading edge sheath portion which not only completes the airfoil contour of the leading edge of the blade, but provides the spar box closure structure necessary to react torsional flight loads.

As mentioned in the structural description of the blade, and similar in nature to the spar/skin, the leading edge sheath 42 is formed by a layup of plies, in the orientation stated, in a rigid female mandrel and compacted, along with the external abrasion strip 46 and counterweight 52, which has been wrapped in fiberglass. Compaction is provided by a mating male die, providing pressure along the ultimate chord line of the blade. It should be noted that this direction of pressure is at right angles to the pressure applied by the match molds utilized in the co-cure process described for manufacture of the blade major portion. Had this leading edge sheath been included in the group of items cured in that operation, the compressive strength of the honeycomb core in the chordwise direction would have been not sufficient to generate the required 50 lb/in$^2$ for compaction of the sheath laminates. A mandrel could be temporarily positioned internally to provide such pressure; however, the difficulties associated with mandrels negate the benefit sought. Utilizing the approach of this invention permits the manufacture of the sheath according to convenient and cost effective methods, e.g., match metal molding, vacuum bagging or resin transfer molding processes.

In a production operation, it is possible to produce a number of leading edge sheath assemblies in a short time period with simple tooling. Alternative methods such as filament winding to produce two sheaths at a time can also be performed. The co-curing of the major blade portion requires a full tool and use of a large press, and it is an object of this invention to require use of such a tool just once per blade. While the primary advantage of a separate leading edge sheath is the compaction of laminates in different directions, a secondary benefit is the accessibility of the counterweight to the weight and balance engineer who may require an incremental chordwise weight adjustment at various spanwise stations of the blade prior to joining fore and aft sections. If the static balance of an aft portion is excessive, it may require additional mass be added to return the blade to a balanced state. Postponement of the bonding of sheath and spar to this time allows the weight engineer to accomplish balance at the optimum point in time; after all composites are cured and before holes are provided for hub attachment.

As illustrated in FIG. 3, the rearward portion of the leading edge sheath and the forward portion of the spar/skin laminates are formed having mating and stepped bond planes 82, oriented such that when assembled, the leading edge sheath overlays the primary blade assembly, thus preventing aerodynamic suction from lifting the spar/skin. This maintains a structural and aerodynamic blade section. This assembly of the sheath and major co-cured aft portion, using the bond planes as pilot surface requires only positioning and clamping fixtures during their bond cycle.

Thus, the blade manufacturing process is essentially a single-step co-cure operation, and the process thus requires a minimum number of individual operations at relatively low cost in terms of tooling and capital equipment.

It should be understood that the invention is not limited to the particular embodiments shown and described herein, but that various changes and modifications may be made without departing from the spirit and scope of this novel concept as defined by the following claims.

We claim:

1. An advanced composite helicopter rotor blade of predetermined airfoil contour from leading edge to trailing edge including upper and lower spar/skin members, a leading edge sheath and a trailing edge stiffener, an internal I-shaped web located at a midchord position of the blade, said web having flanges in contact with the inner surfaces of said upper and lower spar/skin members, a first honeycomb core positioned on the leading edge side of said web, and a second honeycomb core positioned on the trailing edge side of said web, said spar/skin members, leading edge sheath, and web comprising the structural support of said blade for reaction of torsion and bending moments, said trailing edge stiffener, leading edge sheath and said spar/skin members combining to comprise a secondary structural support, a metallic counterweight positioned within said leading edge sheath for a portion of the blade span, said leading edge sheath being joined to said upper and lower spar/skin members by a plurality of bond planes, balance weights positioned in the honeycomb core in the outer portion of the blade and a tip closure, said spar/skin members being formed of a plurality of preselected ply groupings, and wherein said blade is manufactured substantially by a single major cure process combining and positioning said upper and lower spar/skin members, I-shaped web, first and second honeycomb cores, and trailing edge stiffener in a matched metal mold, closing the mold against the back pressure of the honeycomb core, compacting the spar/skin laminates, and curing said blade members, thus forming a major blade portion, followed by the bonding of said leading edge sheath to said major blade portion.

2. A helicopter blade according to claim 1 wherein said sheath comprises a plurality of selected ply groupings, and is formed to shape independently of the major blade portion wherein the process consists in the steps of laying up said ply groupings into a mold, inserting said metallic counterweight, and compacting and curing said assembly.

3. A helicopter blade according to claim 1 wherein the back pressure applied to the spar/skin members by the honeycomb core members is provided for by use of overthick honeycomb core wherein said spar/skin members and said core become compacted due to the closure of the matched metal mold.

4. A helicopter blade according to claim 1 wherein the spar/skin ply grouping has a spar portion consisting of plies of composite material in which there are two plies at 0°, one ply at +30°, and one ply at −30° and a skin portion consisting of plies of composite material in which there is one ply at +45° and another ply at −45°.

5. A helicopter blade according to claim 1 wherein said spar/skin tapers in chordwise and spanwise directions.

6. A helicopter blade according to claim 1 wherein the wall of said I-shaped web contacts the adjacent edge of said honeycomb cores and the inner surfaces of the flanges of said I-shaped web are compacted against necked-down outer surfaces.

* * * * *